United States Patent [19]

Miller

[11] Patent Number: 5,330,829
[45] Date of Patent: Jul. 19, 1994

[54] ELASTOMERIC COMPOSITION CONTAINING ELASTOMER AND AMORPHOUS PROPYLENE/HEXENE COPOLYMER

[75] Inventor: Richard A. Miller, Kingsport, Tenn.

[73] Assignee: Eastman Chemical Company, Kingsport, Tenn.

[21] Appl. No.: 153,407

[22] Filed: Nov. 15, 1993

Related U.S. Application Data

[62] Division of Ser. No. 923,414, Jul. 31, 1992, Pat. No. 5,274,037.

[51] Int. Cl.$^5$ .................. C08F 210/14; C08F 10/14; C08L 53/02; C08L 9/06
[52] U.S. Cl. .................. 428/286; 428/521; 525/93; 525/98; 524/271
[58] Field of Search .................. 525/98, 93; 524/271; 428/521, 286

[56] References Cited

U.S. PATENT DOCUMENTS

| | | | |
|---|---|---|---|
| 3,850,858 | 11/1974 | Park | 524/271 |
| 3,862,068 | 1/1975 | Russell | 524/271 |
| 3,923,758 | 12/1975 | Carter et al. | 526/152 |
| 3,954,697 | 5/1976 | McConnell et al. | 526/348.3 |
| 4,072,812 | 2/1978 | McConnell et al. | 526/348.3 |
| 4,072,813 | 2/1978 | McConnell et al. | 526/348.3 |
| 4,146,586 | 3/1979 | McConnell | 525/174 |
| 4,259,470 | 3/1981 | Trotter et al. | 526/348.3 |
| 4,425,257 | 1/1984 | Miro et al. | 502/105 |
| 4,567,223 | 1/1986 | Ames | 524/489 |
| 4,627,847 | 12/1986 | Puletti et al. | 604/366 |
| 4,692,161 | 9/1987 | Puletti et al. | 604/366 |
| 4,826,939 | 5/1989 | Stuart | 526/348.5 |
| 5,026,759 | 6/1991 | Wakabauashi | 524/271 |

FOREIGN PATENT DOCUMENTS

| | | |
|---|---|---|
| 0333194A1 | 1/1979 | European Pat. Off. . |
| 0411191A1 | 8/1989 | European Pat. Off. . |
| 92/08764 | 5/1992 | World Int. Prop. O. . |

*Primary Examiner*—James J. Seidleck
*Assistant Examiner*—I. Zemel
*Attorney, Agent, or Firm*—Mark A. Montgomery

[57] ABSTRACT

An elastomeric composition is prepared containing an amorphous propylene/hexene copolymer and an elastomer selected from styrene butydiene styrene block copolymers.

14 Claims, No Drawings

ELASTOMERIC COMPOSITION CONTAINING ELASTOMER AND AMORPHOUS PROPYLENE/HEXENE COPOLYMER

This is a divisional application of copending application Ser. No. 07/923,414 filed Jul. 31, 1992, now U.S. Pat. No. 5,274,037.

This invention relates to elastomeric compositions used in hot-melt formulations that contain an elastomer and an amorphous propylene/hexene copolymer. This invention also relates to adhesively bonded articles such as construction components of diapers.

BACKGROUND OF THE INVENTION

Elastomeric compositions are well known and have been used in the industry for various applications such as adhesives, caulks, and sealants. These compositions typically contain an elastomer, a resin, a process oil, and optionally a filler. The most costly component of these compositions is the elastomer. Therefore, compositions containing reduced amounts of elastomer to produce lower cost formulations would be very desirable and have been attempted in the industry. These lower cost formulations containing lower amounts of elastomer typically have increased amounts of filler or process oil and/or additional polymers such as low molecular weight polybutenes. However, these lower cost formulations typically have lower performance illustrated by poor creep resistance, low peel adhesion, low tensile strength and/or poor weathering performance.

It would, therefore, be very desirable to produce low cost elastomeric formulations such as adhesives containing reduced amounts of elastomer while retaining the performance of formulations containing the high amounts of elastomer.

SUMMARY OF THE INVENTION

The present invention is directed to unique compositions containing an elastomer and an amorphous propylene/hexene copolymer. These compositions are useful in adhesive formulations used to adhesively bond substrates such as used in diaper construction and contain a reduced amount of elastomer while retaining and/or improving performance properties such as peel adhesion and creep (delamination) resistance. These compositions comprise:
(a) up to 90 wt. %, based on (a) plus (b), of an amorphous propylene/hexene copolymer, containing at least 20 wt. % propylene;
(b) at least 10 wt. %, based on (a) plus (b), of an elastomer selected from styrene butadiene styrene block copolymers and optionally contains up to about 70 wt. % of a tackifier and up to about 30 wt. % of a process oil.

DETAILED DESCRIPTION OF THE INVENTION

The applicant has unexpectedly discovered that the amorphous propylene/hexene copolymer extends the elastomer, partially replacing the elastomer in the formulation while retaining and/or improving performance properties such as enhanced peel adhesion and creep resistance. These elastomeric compositions have been discovered to be particularly useful, due to their good performance properties, in the construction of bonded elastic portions of expandable articles, such as used in the body contact portion on the outer edge of diapers. The parts of a diaper that contact the waist and legs must be flexible, expanding and contracting many times during use. Additionally, these parts must maintain their bond integrity over the useful life of the diaper, thus the need for good peel adhesion and creep resistance.

The composition of the present invention preferably comprises:
(a) about 10 to 90 wt. %, based on (a) plus (b), of an amorphous propylene/hexene copolymer, containing at least 20 wt % propylene;
(b) about 10 to 90 wt. %, based on (a) plus (b), of an elastomer selected from styrene butadiene styrene block copolymers;
(c) about 0 to 70 wt. %, based on the total weight, of a tackifier, and;
(d) about 0 to 30 wt. %, based on the total weight, of a process oil.

The amorphous propylene/hexene copolymers are known and are generally prepared by anionic coordination polymerization. They are made in solution or in the melt phase at 160°-200° C. These amorphous propylene/hexene copolymers are illustrated in the following U.S. Pat. Nos. 4,072,812 and 4,425,257, the disclosures of which are incorporated herein in their entirety by reference.

The amorphous propylene/hexene copolymers must contain a significant amount of hexene in order to lower the melting point of the polymer and increase its tackiness. These amorphous propylene copolymers preferably contain between about 40 and 70 wt. % hexene, more preferably between about 50 and 65 wt. % hexene, with a hexene concentration of about 60 wt. % being most preferred.

The amorphous propylene/hexene copolymers can alternatively be terpolymers and contain minor amounts of monomers other than propylene or hexene, but this is less preferred. This third monomer is preferably present in a concentration that is no more than about 10% by weight. Should the propylene/hexene copolymers contain a third monomer the amount of this third monomer can be between about 0.5 and 10% by weight. Suitable examples of this third monomer are butene and ethylene.

The amorphous propylene/hexene copolymers used in the present invention generally have a melt viscosity at 190° C. between 2,000 and 30,000 centipoises (cps), preferably between 3,000 and 20,000 cps, with a melt viscosity between about 4,000 and 6,000 cps being more preferred. The amorphous propylene/hexene copolymers should not have such a high melt viscosity that it prevents them from being precessable but yet not have such a low melt viscosity to cause them to cold flow.

The amorphous propylene/hexene copolymers used in the present invention generally have a weight average molecular weight between about 2,000 and 20,000, preferably between about 3,000 and 10,000 with a weight average molecular weight between about 3,000 and 7,000 being most preferred. The higher molecular weight amorphous propylene/hexene copolymers are generally less preferred in that they don't provide as good of a bond in the final adhesive composition and thus result in lower creep resistance.

The amorphous propylene/hexene copolymers can also be maleated amorphous propylene/hexene copolymers but this is not necessary since this does not dramatically increase adhesion. These maleated copolymers can have an acid number between about 23 and 44, preferably between about 20 and 23. Maleated amorphous propylene copolymers are well known in the art and are prepared by graft polymerization as illustrated in U.S. Pat. No. 4,567,223 the disclosure of which is incorporated in its entirety herein by reference.

The composition according to the present invention preferably contains about 25 to 75 wt. % amorphous propylene/hexene copolymer based on a total of copolymer and elastomer. More preferably the composition contains between about 40 and 60 wt. % amorphous propylene/hexene copolymer with about 50 wt. % amorphous propylene/hexene copolymer being most preferred.

The composition according to the present invention, when used as a hot-melt adhesive formulation, preferably contains about 20 to 70 wt. % tackifier more preferably about 40 to 60 wt. %.

The tackifier used in the composition of the present invention is preferably selected from at least one of the groups consisting of hydrocarbon resins, synthetic polyterpenes, and rosin esters. The tackifier preferably has a ring and ball softening point of about 95° to 135° C. Suitable resins and rosin esters are the terpene polymers having the suitable ring and ball softening point such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing a mixture of sulphate terpene, and at least 20% of at least one other terpene selected from the group consisting of pinene, limonene, or dipentene.

The more preferred tackifying resins are selected from hydrocarbon resins such as disclosed in U.S. Pat. No. 3,850,858 the disclosure of which is incorporated in its entirety herein by reference. These hydrocarbon resins preferably have a ring and ball softening point of about 100° to 130° C., an acid number of about 0 to 2 an acid value of less than about 1 and an iodine value of 75 to 100. These hydrocarbon tackifying resins can be prepared by the polymerization of monomers consisting primarily of olefins and diolefins and include, for example, the residual by-product monomers resulting from the manufacture of isoprene.

The process oil used in the present invention is preferably present in a concentration between about 5 and 30 wt. % base on the total composition, more preferably between about 15 and 25 wt. % with about 20 wt. % being most preferred. The amount of process oil is preferably high enough to platicize the composition and reduce the cost but not so high as to significantly reduce adhesion. Suitable process oils include, for example, naphthenic oils, paraffinic oils, aromatic oils, white mineral oils, low molecular weight phthalate oil type plasticizers, and mixtures thereof. A more preferred process oil used in the composition of the present invention is selected from blends of naphthenic and paraffinic oils such as 50 wt. % naphthenic oil, 49 paraffinic oil and 1 wt. % aromatic oil. The most preferred process oil has a weight average molecular weight of 400.

The elastomeric compositions of the present invention can contain other materials such as fillers. However, these materials are preferably present in only minor amounts so as to not significantly lower the good physical properties of the composition. Fillers suitable for use in the present invention are, for example, finely divided fume silica, calcium carbonate, titanium dioxide, zinc dioxide, graphite, clay, talc, other metal oxides, and the like. Such fillers have a particle size not much greater than 20 microns preferably between about 5 and 10 microns and are preferably selected from calcium carbonate, titanium dioxide, and zinc dioxide.

The elastomer used in the elastomeric composition of the present invention is selected from styrene/butadiene/styrene block copolymers. These elastomers are generally known and are available commercially such as the Steron elastomers from Firestone. These styrene/butadiene/styrene block copolymers are randomly blocked copolymers containing at least 30 mole percent styrene. These styrene/butadiene/styrene block copolymers preferably contain about 40 to 45 mole percent styrene with a styrene content of about 40 to 43 mole percent being most preferred such as Steron 840A. The elastomers of the present invention are also preferably non-hydrogenated styrene/butadiene/styrene block copolymers.

Antioxidants can also be added to the adhesive composition of the present invention. Examples of effective antioxidants include, tris(di-t-butyl-p-hydroxybenzyl)-trimethylbenzene (available as Ionox 330 from Shell Chemical), alkylated bisphenol (available as Naugawhite from Uniroyal), zinc dibutyl dithiocarbamate (available as Butyl Zimate from R.T. Vanderbilt), and 4,4'-methylene bis(2,6-di-tert--butylphenol) (Ethyl 702), tetrakis[methylene(3,5-di-tert-butyl-4-hydroxyhydroinnamate)methane] (available as Irganox 1010 from Ciba Geigy), lauryl stearyl thiodipropionate (Plastanox 1212), and dilauryl 3,3'-thiodipropionate (Plastanox LTDP), and 2,6-di-tert-butyl-p-cresol (BHT).

The following examples are presented to further illustrate the present invention and are not intended to limit the reasonable scope thereof.

EXAMPLES

The examples illustrate the improvements in strength and creep resistance by substituting a amorphous propylene/hexene copolymer according to the present invention for a portion of styrene/butadiene/styrene block copolymer elastomer. Blends were made using a Sigma Blade Mixer at a temperature of 350° F. and compounding for a minimum of 2 hours. The only variables were the amount of elastomer and type of amorphous polyolefin. The composition and results of the improvement in peel adhesion of elastic to polypropylene nonwoven, and creep resistance listed in the following tables.

EXAMPLE 1 (COMPARATIVE)

The following example illustrates the preparation of control elastomeric compositions.

TABLE 1

| Testing Formulation | Percent/Weight | |
| --- | --- | --- |
|  | A | B |
| Styrene-butadiene-styrene copolymer[1] | 20 | — |
| Styrene-ethylene butadiene-styrene[2] copolymer | — | 20 |
| Tackifier | 60[3] | 60[4] |
| Process oil[5] | 20 | 20 |

TABLE 1-continued

| Testing Formulation | Percent/Weight | |
|---|---|---|
| | A | B |
| Antioxidant[6] | .5 | .5 |

[1] A 42% styrene, 58% butadiene random blocked copolymer (Steron 840A - Firestone)
[2] A linear blocked copolymer of ethylene-butadiene midblock, with styrene endblock. (Kraton G-1652 - Shell Chemical)
[3] Tackifier — a polyterpene resin (Zonatac - Arizona Chemical)
[4] Tackifier — a C-5 hydrocarbon - 130° C. RBSP (Eastotac H-130L - Eastman Chemical Co.)
[5] A blend of 50% naphthenic, 49% paraffinic oil, 1% aromatic oil. (Shellflex 371 - Shell Chemical)
[6] A phenol derivative antioxidant (Irganox 1010 - Ciba-Geigy)

This formulation was compounded in a double arm mixer at 350° F. for two hours. The creep resistance were prepared by laminating elastic, stretched 100% to polypropylene nonwoven, at an adhesive add on weight of 3 mg/in. Twelve creep resistance specimens were stretched 100% onto a panel, placed in a 100° F. oven for eight hours. Creep resistance or delamination of the elastic to polypropylene was observed, and measured in number passed or failed of the twelve specimens. The peel adhesion tests were prepared by bonding, at 325° F., 3 mg/in. hot melt to polypropylene non-woven, and then laminating elastic. Five test specimens were averaged per test, by T-peel type adhesion testing, and reported in pounds per square inch.

| Test Results | A | B |
|---|---|---|
| T-Peel Adhesion (pounds per square inch) | .12 | .05 |
| Creep Resistance number passed | 9 | 12 |
| number failures | 3 | 0 |

EXAMPLE 2

The formulations below were prepared and tested as above in Example 1 with the variations listed in the table. Table 2 below illustrates that the addition of an amorphous propylene/hexene copolymer to the elastomeric composition enhances the peel strength of the adhesive and retains creep resistance performance.

TABLE 2

| Testing Formulation | Percent/Weight | |
|---|---|---|
| | A | B |
| Styrene-Butadiene-Styrene Elastomer | 10 | 10 |
| Tackifier, Zonatac 105L | 60 | 60 |
| Shellflex 371 Process Oil | 20 | 20 |
| Amorphous Propylene-Hexene Copolymer* | 10 | — |
| Amorphous Propylene-Butene Copolymer** | — | 10 |
| Test Results | A | B |
| T-Peel Adhesion (pounds per square inch) | .26 | .31 |
| Creep Resistance - passed | 9 | 0 |
| failures | 3 | 12 |

*Propylene-Hexene Copolymer Containing 60% Hexene, 40% Propylene
**Propylene-Butene Copolymer Containing 70% Butene and 30% Propylene

EXAMPLE 3 (COMPARATIVE)

The formulations below were prepared and tested as above in Example 1 with the variations listed in the table. Table 3 below illustrates that the addition of an amorphous copolymer of propylene and hexene does not maintain the properties of an elastomer that is a linear block copolymer i.e., styrene-ethylene-butadiene-styrene block copolymer.

TABLE 3

| Testing Formulation | Percent/Weight | | | |
|---|---|---|---|---|
| | A | B | C | D |
| Styrene-Ethylene-Butadiene Styrene Bloc Copolymer | 10 | 10 | 10 | 10 |
| Tackifier, Eastotac H-130L | 60 | 60 | 60 | 60 |
| Shellflex 371, Process Oil | 20 | 20 | 20 | 20 |
| Amorphous Propylene-Hexene Copolymer | 10 | — | — | — |
| Amorphous Propylene-Butene Copolymer | — | 10 | — | — |
| Amorphous Propylene Homopolymer | — | — | 10 | — |
| Terpolymer of Ethylene-Propylene-Butene | — | — | — | 10 |
| T-Peel Adhesion pounds per square inch | .06 | .07 | .11 | .05 |
| Test Results | | | | |
| Creep Resistance @ 100° F. 8 Hours | 12 Pass on all Samples 0 Failures | | | |

The invention has been described in detail with particular reference to preferred embodiments thereof, but it will be understood that variations and modifications can be effected within the spirit and scope of the invention.

We claim:

1. An article of manufacture comprising an adhesive composition between two substrates wherein said adhesive composition comprises:
   (a) an amount up to 90 wt. %, based on (a) plus (b), of an amorphous propylene/hexene copolymer containing at least 20 wt. % propylene;
   (b) at least 10 wt. %, based on (a) plus (b), of an elastomer selected from styrene butadiene styrene block copolymers;
   (c) about 0 to 70 wt. %, based on the total weight of the composition, of a tackifier, and;
   (d) about 0 to 80 wt. %, based on the total weight of the composition, of a process oil.

2. The article of claim 1 wherein one of said two substrates is a non-woven material and the other is an elastic material.

3. The article of claim 2 wherein said non-woven material is polypropylene non-woven material.

4. The article of claim 1 wherein said adhesive and said two substrates are part of a diaper construction.

5. The article of claim 1 wherein said amorphous propylene/hexene copolymer is present in the composition in an amount between about 25 to 75 wt. % based on (a) plus (b).

6. The article of claim 5 wherein said amorphous propylene/hexene copolymer is present in an amount between about 40 to 60 wt. % based on (a) plus (b) and contains about 40 to 70 wt. % hexene.

7. The article of claim 6 wherein said amorphous propylene/hexene copolymer is present in an amount at about 50 wt. % based on (a) plus (b).

8. The article of claim 6 wherein said amorphous propylene/hexene copolymer contains about 50 to 65 wt. % hexene.

9. The article of claim 1 wherein the elastomer is selected from randomly blocked styrene butadiene styrene block copolymers containing at least 30 mole percent styrene.

10. The article of claim 1 wherein said adhesive composition comprises about 20 to 70 wt. % tackifier having a softening point between about 100° and 130° C.

11. The article of claim 10 wherein said adhesive composition comprises about 40 to 60 wt/% tackifier.

12. The article of claim 1 wherein said adhesive composition comprises about 5 to 30 wt. % tackifier having a softening point between about 100° and 130° C.

13. The article of claim 1 wherein said adhesive composition comprises about 5 to 30 wt. % process oil.

14. The article of claim 13 wherein said process oil is selected from blends of naphthenic and paraffinic oils.

* * * * *